(12) United States Patent
Cazuc et al.

(10) Patent No.: US 11,735,153 B2
(45) Date of Patent: Aug. 22, 2023

(54) ACOUSTIC TREATMENT DEVICE FOR AN AIRCRAFT TURBOJET ENGINE NACELLE

(71) Applicant: Safran Nacelles, Gonfreville L'Orcher (FR)

(72) Inventors: Xavier Cazuc, Moissy Cramayel (FR); Meril Dehez, Gonfreville L'Orcher (FR); Laure Hamel, Gonfreville L'Orcher (FR); Eric Thisse, Gonfreville L'Orcher (FR)

(73) Assignee: Safran Nacelles, Gonfreville L'Orcher (FR)

( * ) Notice: Subject to any disclaimer, the term of this patent is extended or adjusted under 35 U.S.C. 154(b) by 591 days.

(21) Appl. No.: 16/725,411

(22) Filed: Dec. 23, 2019

(65) Prior Publication Data

US 2020/0135160 A1    Apr. 30, 2020

Related U.S. Application Data

(63) Continuation of application No. PCT/FR2018/051511, filed on Jun. 21, 2018.

(30) Foreign Application Priority Data

Jun. 23, 2017 (FR) ...................................... 1755772

(51) Int. Cl.
*G10K 11/162* (2006.01)
*B64D 33/02* (2006.01)
*F02C 7/045* (2006.01)
*F02C 7/24* (2006.01)

(52) U.S. Cl.
CPC ............ *G10K 11/162* (2013.01); *B64D 33/02* (2013.01); *F02C 7/045* (2013.01); *F02C 7/24* (2013.01); *B64D 2033/0206* (2013.01); *B64D 2033/0273* (2013.01)

(58) Field of Classification Search
CPC ............ B64D 2033/0206; B64D 33/02; B64D 2033/0273; F02C 7/045; F02C 7/24; G10K 11/162; G10K 11/168; G10K 11/002; G10K 11/172
See application file for complete search history.

(56) References Cited

U.S. PATENT DOCUMENTS 9,702,375 B2 * 7/2017 Costa .................... F04D 29/644
11,434,819 B2 * 9/2022 Murugappan ......... F04D 29/545
11,591,927 B1 * 2/2023 Hall ...................... F01D 21/045
(Continued)

FOREIGN PATENT DOCUMENTS

EP        1880941        1/2008
FR        2975735        11/2012
(Continued)

OTHER PUBLICATIONS

International Search Report for International Application PCT/FR2018/051511, dated Sep. 13, 2018.

*Primary Examiner* — Craig Kim
(74) *Attorney, Agent, or Firm* — Burris Law, PLLC

(57) ABSTRACT

An acoustic treatment device for an aircraft turbojet engine nacelle forms an annular ring including several sections, each section having a sound absorption structure, an outer skin and two lateral skins attached to the inner air inlet shroud of such a nacelle by fasteners, and the sections being connected to each other by battens.

9 Claims, 3 Drawing Sheets

(56) References Cited

U.S. PATENT DOCUMENTS

| | | | | |
|---|---|---|---|---|
| 11,613,373 B2* | 3/2023 | Chilukuri | ............... | F02C 7/047 244/73 R |
| 2002/0006078 A1* | 1/2002 | Battini | ................... | B64D 29/00 367/1 |
| 2010/0236862 A1* | 9/2010 | Stemberger | ............ | B64D 33/02 181/213 |
| 2010/0290892 A1* | 11/2010 | Schwaller | ............ | B64D 33/02 415/119 |
| 2011/0072637 A1* | 3/2011 | Douglas | ................. | F02C 7/045 29/525.01 |
| 2014/0212273 A1* | 7/2014 | Le Borgne | ............... | F02K 3/06 415/200 |
| 2014/0326536 A1* | 11/2014 | Vauchel | ............... | G10K 11/002 181/290 |
| 2015/0023780 A1* | 1/2015 | Costa | ................... | F04D 29/526 415/170.1 |
| 2016/0032834 A1* | 2/2016 | Plante | ...................... | F02K 3/06 415/119 |
| 2016/0146106 A1* | 5/2016 | Baudoin | ................ | F02C 7/045 29/889.22 |
| 2018/0304986 A1* | 10/2018 | Porte | ........................ | B64C 1/40 |
| 2020/0102890 A1* | 4/2020 | Porte | ....................... | F02C 7/045 |
| 2020/0135160 A1* | 4/2020 | Cazuc | ....................... | F02C 7/24 |
| 2020/0325851 A1* | 10/2020 | Higbie | .................... | F01D 25/04 |
| 2020/0339243 A1* | 10/2020 | Bouillon | ................ | F02C 7/045 |

FOREIGN PATENT DOCUMENTS

| | | | | |
|---|---|---|---|---|
| FR | 2980902 | 4/2013 | | |
| WO | WO-2016146924 A1 * | 9/2016 | ............ | B64D 33/02 |

* cited by examiner

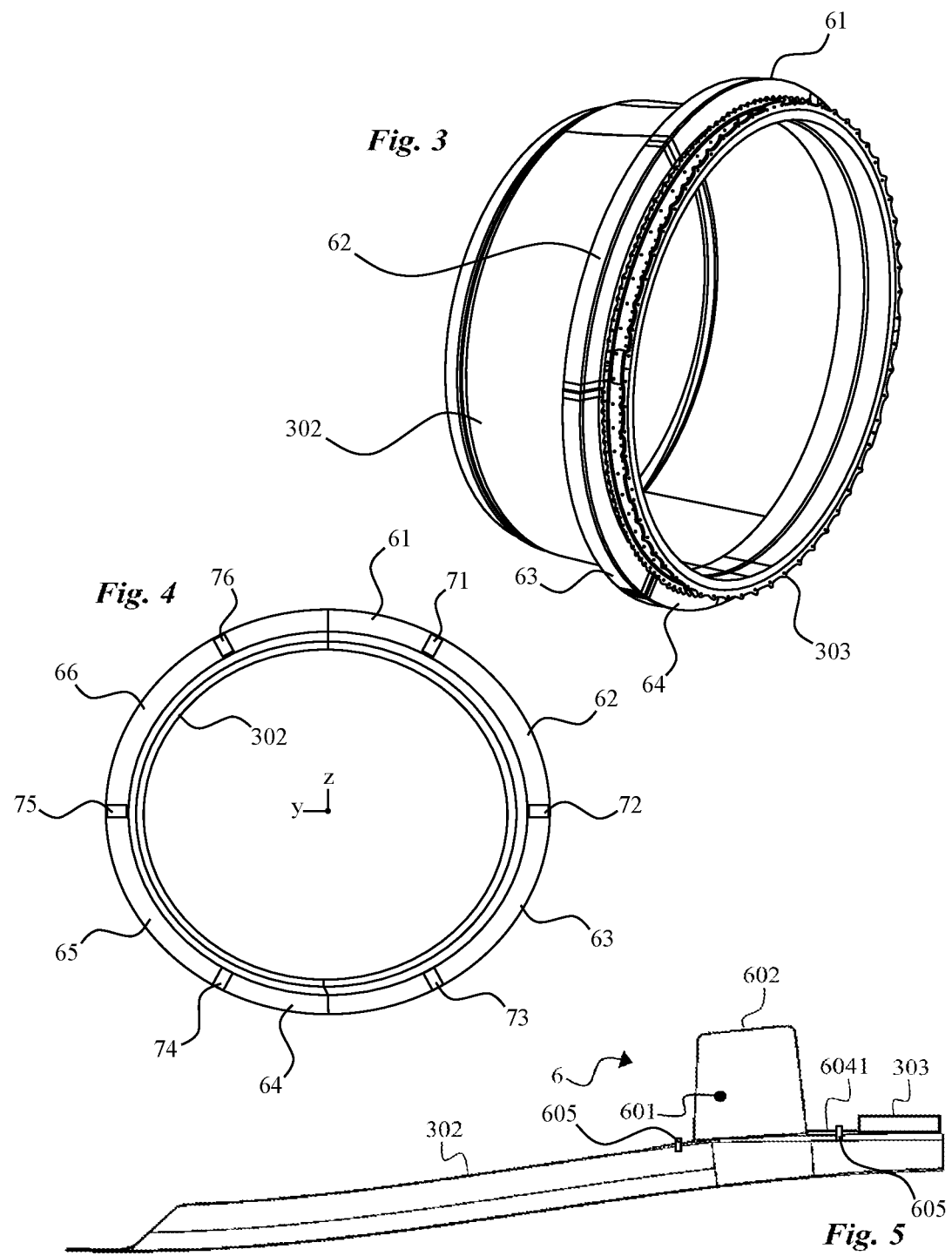

ACOUSTIC TREATMENT DEVICE FOR AN AIRCRAFT TURBOJET ENGINE NACELLE

CROSS-REFERENCE TO RELATED APPLICATIONS

This application is a continuation of International Application No. PCT/FR2018/051511, filed on Jun. 21, 2018, which claims priority to and the benefit of FR 17/55772 filed on Jun. 23, 2017. The disclosures of the above applications are incorporated herein by reference.

FIELD

The present disclosure relates to the field of acoustic treatment of an aircraft turbojet engine nacelle, and more specifically an acoustic treatment device for an air inlet inner shroud of such a nacelle as well as an inner shroud equipped with such a device.

BACKGROUND

The statements in this section merely provide background information related to the present disclosure and may not constitute prior art.

The noise reduction in an aircraft turbojet engine nacelle is generally achieved by overmolding acoustic panels on different parts of the nacelle, in particular on the inner shroud of the air inlet.

In the prior art, there are known acoustic treatment devices in the form of extension parts, sometimes called "deep liner."

As shown in the documents U.S. Publication No. 2010/0236862 A1 and U.S. Publication No. 2010/0290892 A1, an extension part type acoustic treatment device may consist of an annular crown provided with an acoustic absorption structure. Such an annular crown is typically overmolded on an air inlet inner shroud skin.

For an aircraft turbojet engine nacelle comprising an air inlet assembled to a middle section receiving a fan, the acoustic performances can be improved by bringing the acoustic treatment device(s) mounted on the air inlet closer to the middle section. Yet, this action of bringing closer is limited because of the presence of a flange, called "flange A1," on the inner shroud of the air inlet, the flange A1 allowing fastening the air inlet to the middle section.

SUMMARY

The present disclosure provides an acoustic treatment device adapted to be fastened to the inner shroud of an air inlet of an aircraft turbojet engine nacelle so as to provide an acoustic treatment localized in the proximity of a flange A1.

To this end, the present disclosure relates to an acoustic treatment device for an inner shroud of an air inlet of an aircraft turbojet engine nacelle, this device comprising an acoustic absorption structure, an outer skin fastened on an outer surface of the acoustic absorption structure, and two lateral skins clasping the acoustic absorption structure. This device forms an annular crown arranged so as to be mounted on an external periphery of the inner shroud so as to absorb the acoustic energy originating from the inner shroud or a part connected to the inner shroud, for example originating from the middle section or the fan. This device is characterized in that it further comprises rivet type fasteners, in that each of the lateral skins comprises a fastening foot, each fastening foot receiving a portion of the fasteners, and in that the device is arranged so as to be fastened to the inner shroud by these fasteners.

Such an acoustic treatment device avoids both the drawbacks of the overmolding and the gluing. Compared to a fastening by gluing, the riveting allows reducing the dimensions of the fastening feet and therefore bringing the acoustic treatment device closer to the flange A1. Compared to a fastening by overmolding, the riveting simplifies the manufacture and improves the robustness of the device. Indeed, the overmolding involves cooking/heating operations which may not guarantee a satisfactory fastening and could degrade the mechanical and/or acoustic performance of the device.

More generally, the fastening by riveting is particularly simple to implement, facilitates the maintenance operations and allows easily adjusting the fastening forces to the actual mechanical stresses by determining a number of rivets and/or a pitch between the rivets.

In one form, the acoustic absorption structure may be a honeycomb-type cellular structure, for example made of the Nomex® brand aramid material having a density of 32 kg/m$^3$, comprising cells of dimension ⅜". Alternatively, the acoustic absorption structure may be a structure comprising hollow cavities delimited by integrated transverse partitions, for example made of a thermoplastic. An advantage of the partitions is that they can be integrated directly to the device by molding.

The fasteners may be rivets of the "NAS1919M04" standard marketed under the trademark UNIMATIC®.

In one form, the annular crown may comprise several segments. For example, the annular crown may comprise six segments, for example having an identical length. The crown being annular, the length of a segment corresponds in this example to a curvilinear dimension.

The making of the acoustic treatment device in segments promotes the deformation thereof with regards to the mechanical loads produced by the operation of the nacelle. Thus, compared to an acoustic treatment device comprising one single segment, the acoustic treatment device according to the present disclosure is more flexible and more robust.

In one form, when the annular crown comprises several segments, each segment may comprise an acoustic absorption structure, an outer skin and two lateral skins. Indeed, it is generally desirable to acoustically treat the inner shroud over its entire circumference.

In another form, the segments may be connected to each other by battens.

In particular, a batten, and in one example each batten, can connect a first segment and a second segment and be fastened, in one form by riveting:
  to the inner shroud;
  to the outer skin of the first segment;
  to the outer skin of the second segment;
  to the lateral skins of the first segment; and/or
  to the lateral skins of the second segment.

In one form, the outer skin may be fastened to the acoustic absorption structure by gluing/adhesive bonding.

In another form, the lateral skins may be not fastened to the acoustic absorption structure. Indeed, the absence of fastening, in particular by gluing, of the lateral skins with the acoustic absorption structure increases the flexibility of the device and reduces the total mass of the nacelle thanks to the absence of glue between the lateral skins and the acoustic absorption structure.

The present disclosure also relates to an air inlet inner shroud of an aircraft turbojet engine nacelle, this inner shroud comprising an acoustic treatment device as defined in the present document.

The inner shroud of the air inlet typically comprises an acoustic panel provided with an acoustic absorption structure, typically a honeycomb-type cellular structure, an air-permeable inner skin and an air-impermeable outer skin.

In the context of the present disclosure, the annular crown forming the acoustic treatment device according to the present disclosure can be mounted on an external periphery of the inner shroud. The outer skin of the inner shroud may be air-permeable at the level of said external periphery so as to make the acoustic absorption structure of the inner shroud communicate with the acoustic absorption structure of the acoustic treatment device according to the present disclosure. For this purpose, the outer skin of the inner shroud may comprise orifices at the level of said external periphery. In this manner, the acoustic absorption structure of the acoustic treatment device according to the present disclosure can absorb the acoustic energy originating from the inner shroud or a part connected to the inner shroud.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a perspective view of an inner shroud of an aircraft turbojet engine nacelle air inlet comprising an acoustic treatment device according to the present disclosure;

FIG. 4 is a front view of an inner shroud of an aircraft turbojet engine nacelle air inlet comprising an acoustic treatment device according to the present disclosure;

FIG. 5 is a longitudinal cross-sectional view of an inner shroud of an aircraft turbojet engine nacelle air inlet comprising an acoustic treatment device according to the present disclosure;

Figure 1:
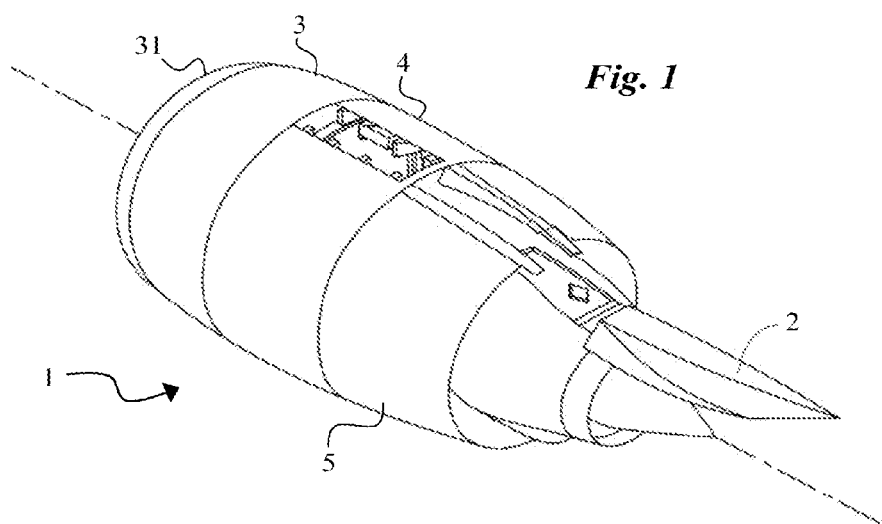
FIG. 1 is a perspective view of an aircraft turbojet engine nacelle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a nacelle 1 of a bypass turbojet engine (not represented) of an aircraft (not represented). The nacelle 1 hangs from a pylon 2 intended to be fastened to a wing (not represented) of the aircraft (not represented). The nacelle 1 comprises an air inlet 3 provided with a lip 31 adapted to enable improved collection, towards the turbojet engine (not represented), of the air that supplies a fan (not represented) and inner compressors (not represented) of the turbojet engine (not represented). The nacelle 1 also comprises a middle section 4 receiving the fan (not represented) as well as a downstream section 5.

Figure 2:
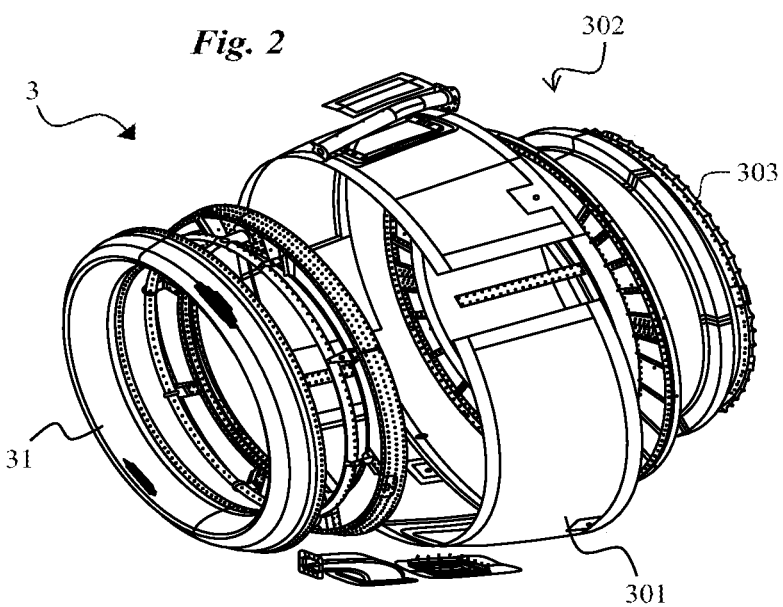
FIG. 2 is an exploded perspective view of an aircraft turbojet engine nacelle air inlet according to the present disclosure.

FIG. 2 shows an air inlet 3 comprising an outer shroud 301 and an inner shroud 302. FIGS. 3 and 4 show an inner shroud 302 separately. The inner shroud 302 comprises a fastening flange 303 arranged so as to be connected to a corresponding flange (not represented) of the middle section 4 of the nacelle 1. In the present document, the fastening flange 303 is also called "flange A1."

In the present document, the terms "inner" and "outer" are defined radially. Thus, for example, the inner shroud is called inner because it is located radially upstream of the outer shroud, and conversely the outer shroud is called outer because it is located radially downstream of the inner shroud.

Referring to FIGS. 2 to 5, the inner shroud 302 comprises an acoustic treatment device 6. In this example, the acoustic treatment device 6 comprises six segments 61-66. In another form which is not represented, the acoustic treatment device 6 may comprise one single segment.

Figure 6:
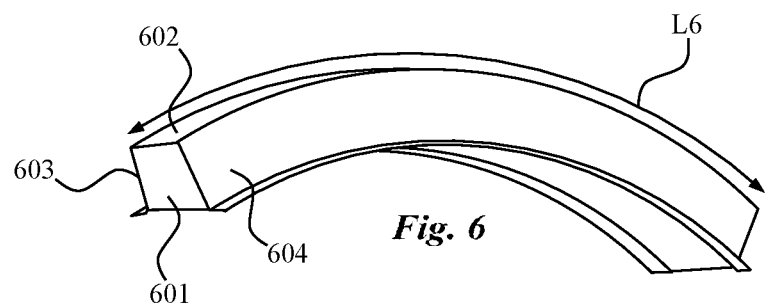
FIG. 6 is a perspective view of a segment of an acoustic treatment device according to the present disclosure.

Referring to FIGS. 5 and 6, each of the segments 61-66 of the acoustic treatment device 6 comprises an acoustic absorption structure 601, an outer skin 602 fastened on an outer surface of the acoustic absorption structure 601, and two lateral skins 603 and 604 clasping the acoustic absorption structure 601.

Figure 8:
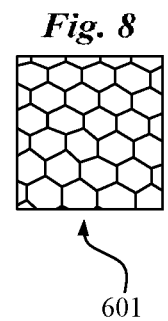
FIG. 8 is a partial view of an acoustic absorption structure of an acoustic treatment device according to a first form of the present disclosure.
Figure 9:
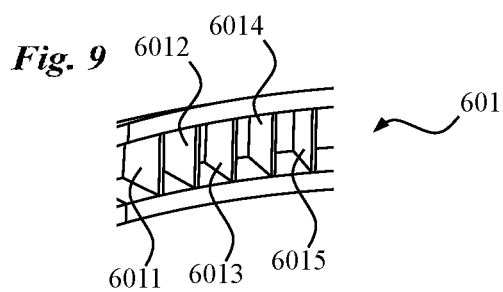
FIG. 9 is a partial view of an acoustic absorption structure of an acoustic treatment device according to a second form of the present disclosure.

In the example of FIG. 8, the acoustic absorption structure 601 is a honeycomb-type cellular structure, for example made of the Nomex® brand aramid material having a density of 32 kg/m$^3$ and comprising cells of dimension ⅜". In the example of FIG. 9, the acoustic absorption structure 601 is a structure comprising hollow cavities delimited by transverse partitions 6011-6015. The partitions may be made of a thermoplastic material or comprise any other suitable material.

FIG. 4 shows in particular that the acoustic treatment device 6 forms an annular crown mounted on an external periphery of the inner shroud 302. When the inner shroud 302 thus equipped with the acoustic treatment device 6 is integrated to a nacelle 1, the acoustic treatment device 6 can absorb the acoustic energy originating from the inner shroud 302 or in particular from the middle section 4 which contains the fan (not represented).

In this example, the six segments 61-66 of the annular crown 6 have an identical length L6 (see FIG. 6). For example, for an inner shroud with an outer diameter of 1400 mm, the length L6 may be comprised between 700 and 800 mm, for example equal to 750 mm. In another form, the length of the segments may differ from one segment to another.

As shown in the example of FIG. 4, the segments 61-66 are connected to each other by battens 71-76. Each of these battens connects two contiguous segments and may be fastened by riveting both to the inner shroud 302, and/or to the outer skin 602 of one of said two contiguous segments or of these two segments, and/or to one or both of lateral skins 603-604 of one of said two contiguous segments or of these two segments. In one form, each batten is fastened both to the inner shroud 302, to the outer skin 602 of the two contiguous segments that it connects and to the lateral skins 603 and 604 of these two contiguous sections.

Figure 7:
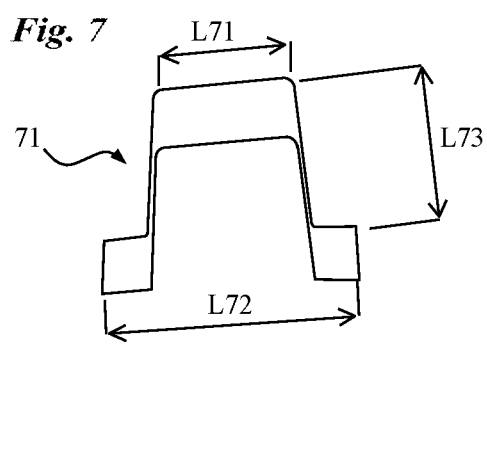
FIG. 7 is a perspective view of a batten of an acoustic treatment device according to the present disclosure.

FIG. 7 shows a batten 71. For example, the batten 71 may have the following dimensions:

a width L71 comprised between 35 and 65 mm, for example equal to 50 mm, the width L71 substantially corresponding to the width of the acoustic treatment device at a top of this device (at the level of the outer skin 602) including the width of the acoustic absorption structure 601 and the thickness of the two lateral skins 603 and 604;

a total width L72 comprised between 70 and 150 mm, and in one form comprised between 100 and 120 mm, for example equal to 110 mm, the total width L72 substantially corresponding to the width of the acoustic treatment device at a base of this device (at the level of the fastening feet, see below), substantially corresponding to the distance between the ends of the fastening feet (see below); and/or a height L73 comprised between 30 and 100 mm, and in one form comprised between 65 and 75 mm, for example equal to 70 mm, the height L73 substantially corresponding to the height of the acoustic treatment device including the height of the acoustic absorption structure 601 and the thickness of the outer skin 602.

In one form, the lateral skins 603 and 604 are not fastened to the acoustic absorption structure 601. In other words, the lateral skins 603 and 604 can be affixed against the acoustic absorption structure 601 and thus held thanks to their geometry of these skins, described in the following.

Figure 10:
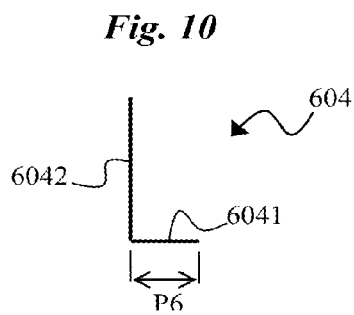
FIG. 10 is a schematic view of a lateral skin of an acoustic treatment device according to the present disclosure.

Each lateral skin, for example the lateral skin 604 shown in FIG. 10, comprises a fastening foot 6041 and a lateral wall 6042. In one form, the fastening foot 6041 and the lateral wall 6042 may have an angle close to 90°, for example comprised between $\pi/3$ and $2\pi/3$, as illustrated in the example of FIG. 5, in order to adapt the geometry of the acoustic treatment device 6 to the space available in the air inlet 3. Nonetheless, this angle should be slightly different from 90° in order to constitute a draft angle.

The fastening foot 6041 may have a width P6 corresponding to substantially half the difference between the total width L72 described above and the width L71 of the batten 71. In the dimensional examples described in the present document, the term "substantially" may be understood as indicating a dimensional tolerance typically of a few millimeters, or in the range of the magnitude of the thickness of a skin or of the batten 71.

In order to fasten the acoustic treatment device 6 to the inner shroud 302, the acoustic treatment device 6 comprises fasteners 605 of the rivet type (shown in FIG. 5) such as "NAS1919M04" (UNIMATIC®) rivets.

For this purpose, when the fasteners 605 are rivets, these may be received by the fastening feet 6041, throughout orifices made in the fastening feet 6041.

In one form, the rivets are fastened in a co-fired skin (not represented) of the inner shroud 302 in order to limit the acoustic disturbances. Alternatively, the fasteners 605 may be fastened so as to pass throughout the inner shroud 302.

The width P6 of the fastening feet 604 (FIG. 10) determines the minimum distance at which the acoustic absorption structure 6 can be placed relative to the flange 303, as shown in FIG. 5.

Because of the proximity of the acoustic treatment device 6 and the flange A1, the fastening of the air inlet 3 on the middle section 4 should be carried out prior to the installation of the acoustic treatment device 6 on the inner shroud 302.

Of course, the present disclosure is not limited to the examples that have just been described and many arrangements can be made to these examples yet without departing from the scope of the present disclosure. For example, the acoustic treatment device 6 may comprise a number of segments selected so as to improve the ratio between, on the one hand, the cost of manufacturing the segments and of assembling the device 6 on the inner shroud 302 and, on the other hand, the flexibility of the device 6.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An inner shroud of an air inlet of an aircraft turbojet engine nacelle, the inner shroud comprising an acoustic treatment device, the acoustic treatment device comprising:
    an acoustic absorption structure;
    an outer skin fastened on an outer surface of the acoustic absorption structure;
    two lateral skins clasping the acoustic absorption structure, each lateral skin comprising a fastening foot; and
    fasteners, each fastening foot receiving a portion of the fasteners, wherein:
    the acoustic treatment device forms an annular crown extending radially and outwardly from an external peripheral surface of the inner shroud to absorb acoustic energy originating from the inner shroud or a part connected to the inner shroud,
    the acoustic treatment device fastened to the inner shroud by the fasteners, and
    the annular crown comprising a plurality of segments, each segment comprising the acoustic absorption structure, the outer skin and the two lateral skins, the plurality of segments connected to each other by battens.

2. The inner shroud according to claim 1, wherein the annular crown comprises six segments.

3. The inner shroud according to claim 1, wherein the two lateral skins are not fastened to the acoustic absorption structure.

4. The inner shroud according to claim 1, wherein the battens are a plurality of discrete battens.

5. The inner shroud according to claim 1, wherein the battens fasten the plurality of segments to the external peripheral surface of the inner shroud.

6. The inner shroud according to claim 1, wherein the battens are fastened to the outer skin of at least one of the segments by riveting.

7. The inner shroud according to claim 1, wherein the battens are fastened to the lateral skins of at least one of the segments by riveting.

8. The inner shroud according to claim 1, wherein the battens are fastened to the inner shroud by riveting.

9. The inner shroud according to claim 1, wherein the inner shroud further comprises a fastening flange configured to be connected to a middle section of the nacelle, the annular crown being disposed adjacent to the fastening flange.

* * * * *